(12) United States Patent
Sharma

(10) Patent No.: US 9,988,279 B2
(45) Date of Patent: Jun. 5, 2018

(54) PRODUCTION OF LITHIUM HYDROXIDE

(71) Applicant: REED ADVANCED MATERIALS PTY LTD, West Perth (AU)

(72) Inventor: Yatendra Sharma, West Perth (AU)

(73) Assignee: Reed Advanced Materials Pty Ltd, West Perth (AU)

( * ) Notice: Subject to any disclaimer, the term of this patent is extended or adjusted under 35 U.S.C. 154(b) by 0 days. days.

(21) Appl. No.: 14/427,646

(22) PCT Filed: Dec. 17, 2014

(86) PCT No.: PCT/AU2014/001142
§ 371 (c)(1),
(2) Date: Mar. 12, 2015

(87) PCT Pub. No.: WO2016/070217
PCT Pub. Date: May 12, 2016

(65) Prior Publication Data
US 2017/0233261 A1    Aug. 17, 2017

(30) Foreign Application Priority Data

Nov. 5, 2014    (AU) .................................. 2014904449

(51) Int. Cl.
| C01D 15/02 | (2006.01) |
| C01D 3/04 | (2006.01) |
| C01D 3/14 | (2006.01) |
| C01D 15/04 | (2006.01) |
| C22B 3/12 | (2006.01) |

(Continued)

(52) U.S. Cl.
CPC ............ *C01D 15/02* (2013.01); *C01D 3/04* (2013.01); *C01D 3/14* (2013.01); *C01D 15/04* (2013.01); *C22B 3/12* (2013.01); *C22B 3/22* (2013.01); *C22B 3/44* (2013.01); *C01P 2006/80* (2013.01)

(58) Field of Classification Search
CPC ....................................................... C01D 15/04
See application file for complete search history.

(56) References Cited

U.S. PATENT DOCUMENTS

| 3,597,340 A | 8/1971 | Honeycutt et al. |
| 4,207,297 A | 6/1980 | Brown et al. |

(Continued)

FOREIGN PATENT DOCUMENTS

| CA | 2796849 A1 * | 10/2011 | ............... C01D 3/04 |
| CN | 101214978 A * | 7/2008 | |

(Continued)

*Primary Examiner* — Melissa S Swain
(74) *Attorney, Agent, or Firm* — Clements Bernard Walker PLLC; Christopher L. Bernard

(57) ABSTRACT

A process (10) for the production of lithium hydroxide, the process comprising the steps of:
  (i) Causticising lithium chloride (12) with sodium hydroxide (16) to produce a lithium hydroxide product;
  (ii) Collecting the solids resulting from the causticisation of step (i) and filtering (22) same;
  (iii) The filtered solids from step (ii) are passed to a heating step (32) in which anhydrous lithium hydroxide is produced;
  (iv) Filtering (34) the anhydrous lithium hydroxide product of step (iii); and
  (v) Quenching the anhydrous lithium hydroxide of step (iv) with water to produce lithium hydroxide monohydrate crystals.

16 Claims, 1 Drawing Sheet

(51) Int. Cl.
*C22B 3/22* (2006.01)
*C22B 3/44* (2006.01)

(56) References Cited

U.S. PATENT DOCUMENTS 4,221,775 A * 9/1980 Anno ..................... C01D 15/02
 423/641
6,555,078 B1 4/2003 Mehta

FOREIGN PATENT DOCUMENTS

CN 102701239 A 10/2012
JP 2006265023 A * 10/2006

* cited by examiner

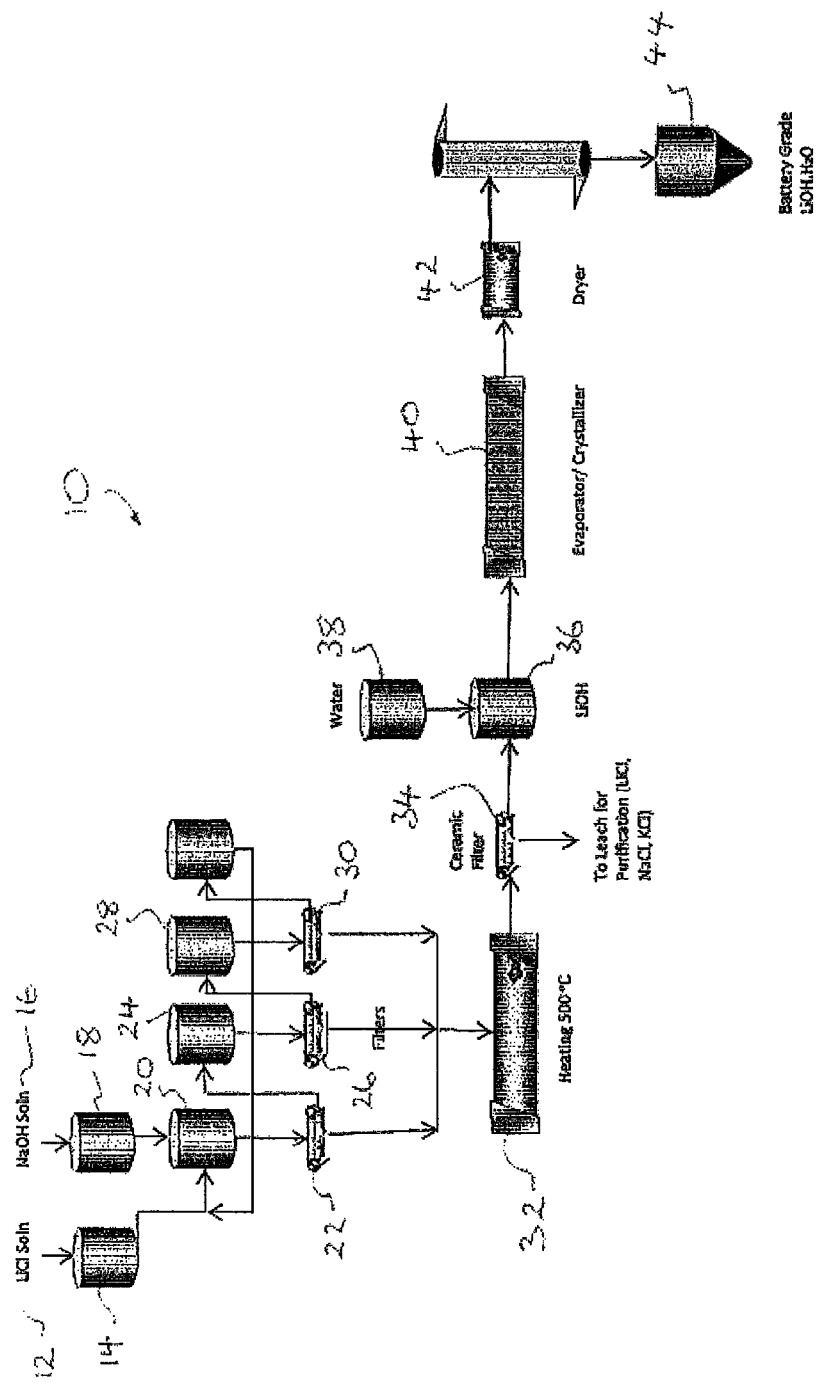

PRODUCTION OF LITHIUM HYDROXIDE

FIELD OF THE INVENTION

The present invention relates to a process for the production of lithium hydroxide. More particularly, the process of the present invention is intended to allow the production of the battery grade lithium hydroxide monohydrate.

In one highly preferred form, the process of the present invention utilises the causticisation of lithium chloride with caustic soda to produce high purity battery grade lithium hydroxide monohydrate.

Additionally, the present invention relates to a process for the treatment of lithium chloride for the production of high purity battery grade lithium hydroxide monohydrate, the process utilising the causticisation of a lithium chloride obtained from either of a spodumene ore or brine source.

BACKGROUND ART

Processes employed to date for the production of lithium hydroxide monohydrate from lithium chloride have typically utilised either electrolysis of lithium chloride, such as that described in U.S. Pat. No. 3,597,340, or the conversion of lithium chloride into lithium carbonate by soda ash, such as that described in U.S. Pat. Nos. 8,691,169 and 8,669,260, followed by the causticisation of lithium carbonate so formed with hydrated lime, such as that described in U.S. Pat. No. 4,207,297.

The above described processes of the prior art are known to be relatively expensive and inefficient. For example, the production of lithium hydroxide monohydrate from the electrolysis of lithium chloride utilises very high quantities of electricity, in the order of >5,000 KWh/MT of $LiOH.H_2O$, and the current efficiency is lower than 65%, see US Patent Publication 2012/0107210. The production of $LiOH.H_2O$ from lithium carbonate using hydrated lime causticisation is expensive as it first requires the production of lithium carbonate from lithium chloride, followed by causticisation using expensive purified hydrated lime as a raw material. In turn this produces a relatively impure lithium hydroxide monohydrate product. The hydrated lime introduces calcium impurities into the lattice of $LiOH.H_2O$ which has to be purified by expensive known methods, thereby increasing the cost of production. This is particularly problematic when attempting to produce high purity battery grade lithium hydroxide monohydrate, such as that having greater than 99.9% purity by weight.

The process of the present invention has as one object thereof to overcome substantially one or more of the above mentioned problems associated with prior art processes, or to at least provide a useful alternative thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the production of lithium hydroxide, the process comprising the steps of:

(i) Causticising lithium chloride with sodium hydroxide to produce a lithium hydroxide product;
(ii) Collecting the solids resulting from the causticisation of step (i) and filtering same;
(iii) The filtered solids from step (ii) are passed to a heating step in which anhydrous lithium hydroxide is produced;
(iv) Filtering the anhydrous lithium hydroxide product of step (iii); and
(v) Quenching the anhydrous lithium hydroxide of step (iv) with water to produce lithium hydroxide monohydrate crystals.

Preferably, the lithium chloride of step (i) is a purified lithium chloride.

Still preferably, the lithium chloride of step (i) is obtained from either a brine or spodumene source.

The causticising step (i) preferably employs a stoichiometric ratio of lithium chloride and sodium hydroxide.

In one form of the present invention the causticising step (i) is conducted in a series of three or more reaction vessels. The residence time in each reaction vessel is preferably between about 15 and 60 minutes. Still preferably, the residence time in each reaction vessel is about 30 minutes.

Preferably, after the relevant residence time of step (i) the product is filtered, producing a filtrate comprising precipitated lithium hydroxide monohydrate, sodium chloride and some un-reacted lithium chloride.

Still preferably, the remaining solution from filtration, containing both lithium chloride and sodium hydroxide, is recycled to the first of the series of reaction vessels.

The heating step (iii) is preferably conducted at about 500° C. in a closed nitrogen atmosphere. Further, the filtering step (iv) preferably utilises ceramic filters.

Preferably, the lithium hydroxide monohydrate crystals produced in step (v) are dried at about 45° C. under vacuum.

It is understood that the lithium hydroxide monohydrate product of the present invention is of a purity of greater than 99.9% by weight. This makes the product particularly suitable for use as a high purity battery grade cathode material.

In accordance with the present invention there is further provided a process for the treatment of lithium chloride obtained from either spodumene or brine source to produce a lithium hydroxide monohydrate product, the process comprising the steps of:

(i) Passing the purified lithium chloride product obtained through either a brine or spodumene source to react with sodium hydroxide solution thereby producing lithium hydroxide;
(ii) A stoichiometric ratio of the solutions of LiCl and NaOH are allowed to react in series of reaction vessels (minimum of three) for a residence time of fifteen minutes to an hour in each vessel, preferably half an hour, this reaction being exothermic;
(iii) After completion of residence time of the stoichiometric solutions of LiCl and NaOH in each reaction vessel, the mass is filtered which consists of precipitated lithium hydroxide monohydrate, sodium chloride and in part un-reacted LiCl;
(iv) All solids thus formed in all the three or more reaction vessels are collected, whereas spent mixture of solution of LiCl and NaOH is recycled to the first reaction vessel;
(v) The solids of step (iv) are heated at about 500° C. in closed nitrogen atmosphere, thereby melting lithium hydroxide which is in turn filtered using, optionally, ceramic filters; and (vi) Lithium hydroxide anhydrous thus obtained is quenched with water to form lithium hydroxide monohydrate crystals which are dried at 45° C. under vacuum, and packaged.

The Lithium hydroxide monohydrate obtained by the above process is of very high quality and consequently suitable for use as high purity battery grade cathode material.

The solid products of the filters of step (v), which preferably consists of predominantly NaCl, but some LiCl, are sent to re-leaching where LiCl is separated.

BRIEF DESCRIPTION OF THE DRAWINGS

The process of the present invention will now be described, by way of example only, with reference to one embodiment thereof and the accompanying drawings, in which:

FIG. 1 is a schematic flow-sheet depicting a process for the production of lithium hydroxide in accordance with the present invention.

BEST MODE(S) FOR CARRYING OUT THE INVENTION

The present invention provides a process for the production of lithium hydroxide, the process comprising the steps of:
(i) Causticising lithium chloride with sodium hydroxide to produce a lithium hydroxide product;
(ii) Collecting the solids resulting from the causticisation of step (i) and filtering same;
(iii) The filtered solids from step (ii) are passed to a heating step in which anhydrous lithium hydroxide is produced;
(iv) Filtering the anhydrous lithium hydroxide product of step (iii); and
(v) Quenching the anhydrous lithium hydroxide of step (iv) with water to produce lithium hydroxide monohydrate crystals.

The lithium chloride of step (i) is a purified lithium chloride, obtained from either a brine or spodumene source. The causticising step (i) employs a stoichiometric ratio of lithium chloride and sodium hydroxide.

In one embodiment of the present invention the causticising step (i) is conducted in a series of three or more reaction vessels. The residence time in each reaction vessel is between about 15 and 60 minutes. The residence time in each reaction vessel is about 30 minutes.

After the relevant residence time of step (i) the product is filtered, producing a filtrate comprising precipitated lithium hydroxide monohydrate, sodium chloride and some un-reacted lithium chloride. The remaining solution from filtration, containing both lithium chloride and sodium hydroxide, is recycled to the first of the series of reaction vessels.

The heating step (iii) is conducted at about 500° C. in a closed nitrogen atmosphere. Further, the filtering step (iv) utilises ceramic filters. The lithium hydroxide monohydrate crystals produced in step (v) are dried at about 45° C. under vacuum.

It is understood that the lithium hydroxide monohydrate product of the present invention is of a purity of greater than 99.9% by weight. This makes the product particularly suitable for use as a high purity battery grade cathode material.

The process of the present invention will now be described, with reference to one embodiment thereof and a single FIGURE, for the purposes of illustration.

In FIG. 1 there is shown a process 10 for the production of lithium chloride, in accordance with one embodiment of the present invention, the process 10 comprising in part the treatment of lithium chloride with sodium hydroxide All of the unit operations embodied in the process are intended to operate continuously with full process instrumentation and control being provided for.

A solution of LiCl 12 between about 15% to 30% w/w, for example about 20% w/w, obtained from either spodumene or brine source is first prepared in one vessel 14. Similarly a solution of NaOH 16 between 30% to 45% (w/w), for example about 45% w/w, is prepared in a separate vessel 18.

NaOH solution is added to LiCl solution slowly with a residence time of between about 15 minutes to an hour, for example about half an hour, in a first reaction vessel 20. This causticisation reaction is exothermic, and immediately solids are formed.

These solids formed in causticisation are filtered in a filtration step 22, and the filtrate passed to another vessel 24. The filtrate consists largely of un-reacted NaOH and LiCl. The reaction is continued for another half an hour in the second reaction vessel 24, and solids formed are removed in a filtration/separation step 26. This process is repeated at least one further time through a third reaction vessel 28 and filtration/separation step 30. The process is ideally repeated three times or more because of the precipitation of LiOH and NaCl during each process which passivates the reaction unless removed.

The solids thus obtained consist largely of precipitates of $LiOH.H_2O$, NaCl and some unreacted LiCl, are sent to an indirectly heated kiln 32 to heat the mixture at about 500° C. LiOH is thereby melted at this temperature and the molten salt filtered using ceramic filters 34.

The melted molten salt which is consists of highly pure lithium hydroxide, having purity exceeding about 99.9% w/w in anhydrous form, is cooled and quenched in a vessel 36 with water 38 to obtain lithium hydroxide monohydrate crystals, in an evaporator/crystalliser 40, of high purity exceeding 99.9%.

These high purity battery grade lithium hydroxide monohydrate crystals with >99.9% purity are dried at 45° C. under vacuum in a drier 42, and packed 44.

The solids after filtration of LiOH as molten salt consisting largely of NaCl and some unreacted LiCl (the composition of the solid is >90% NaCl and <10% LiCl). These components are separated using standard methods known to the persons skilled in the art, such methods including HCl acid gas sparge crystallisation of the solution of these solids.

The process of the present invention will now be described, and may be better understood, with reference to the following non-limiting example.

Causticisation of LiCl with NaOH

LiCl crystals and NaOH solid flakes at stoichiometric ratio are first weighed for use in the process of the present invention. A LiCl solution at a strength of 15% (w/w) and a NaOH solution at strength of 25% (w/w) are prepared in polyvinylidene fluoride (PVDF) lined equipment fitted with stirrer(s).

In a suitable PVDF lined reaction vessel with both a heat exchanger and stirrer fitted to it, the NaOH solution is slowly added to the LiCl solution. The reaction is highly exothermic and continuous cooling through a heat exchanger is required/provided. The temperature of the reaction is maintained at 80° C. A graphite heat exchanger is preferably utilised. The content of the reaction vessel is continuously stirred at 300 to 500 rpm.

One by-product of the above reaction is NaCl which has a tendency to passivate the reaction. As such, it is necessary to continuously remove/separate NaCl crystals formed in the reaction vessel, typically after a residence time of about 30 minutes. This separation of solid is performed using press filters having anti-corrosive lining, for example a PVDF lining.

The filtrate from this separation step is further treated with NaOH solution. After a residence time of about 30 minutes, the step of the addition of NaOH solution to LiCl solution as described above is repeated, as is the filtration/separation step in which NaCl crystals are removed.

The reaction and filtration steps are repeated till >99% LiCl has reacted with NaOH and has been converted into LiOH. This is confirmed at that time by the chemical analysis of the filtrate.

Separation of LiOH from NaCl By-Product

Solids collected during the filtration/separation steps described above are a mixture of LiOH and NaCl, with traces of LiCl. These solids are transferred to a ceramic heater and heated to a temperature of 500° C., which is above the melting point of LiOH.

After heating the solids, and when the LiOH is now present as a molten salt, the slurry is passed through an alkali resistant open pore ceramic filter. Any solid contaminants are removed by means of a ceramic filter selected from the group consisting of magnesium oxide, aluminium oxide and zirconium oxide ceramic filters. The ceramic filter has a porosity of 20 to 50 pores per inch.

The filtered molten LiOH is cooled and quenched with water. Sufficient water is added to prepare saturated solution of LiOH.

LiOH monohydrate crystals are crystallised using an evaporative crystallisation process. After crystallisation the LiOH monohydrate crystals are dried at <45° C. under vacuum, and packed.

The solids containing predominantly NaCl, with some LiOH and LiCl (<5%), are passed to a process in which lithium salt is separated and removed from NaCl by an HCl acid gas sparging method.

Removal of Li Compounds from NaCl

A clear solution of NaCl, with any remaining LiOH and LiCl, is first prepared.

HCl acid gas is sparged into the solution as to increase the HCl acid concentration to about 36% (w/w). This process is carried out in glass lined or graphite equipment.

Due to the common ion effect, and NaCl having nearly zero solubility at 36% HCl acid strength, all NaCl is precipitated. The LiCl present remains in solution. It should be noted that any LiOH present in the steps immediately above is converted into LiCl by HCl acid gas.

A resulting slurry is filtered using press filters with anti-corrosive lining, for example a PVDF lining. NaCl as solid is filtered out whilst the LiCl remains in the filtrate.

HCl acid is distilled off using graphite equipment available for acid recovery similar to acid recovery from iron pickling units. The resulting pure LiCl residue is recycled for causticisation with NaOH to produce LiOH as described initially above.

The process of the present invention is understood by the Applicant to be distinct to prior art processes, at least in part, as it utilises inexpensive NaOH to causticise LiCl, which is a commercially available raw material product of high purity. The separation of high purity LiOH is performed using an innovative molten salt technology utilising the principles of lower melting point of LiOH as compared to other constituents of the mixture, such as NaCl.

Modifications and variations such as would be apparent to the skilled addressee are considered to fall within the scope of the present invention.

The invention claimed is:

1. A process for the production of lithium hydroxide, the process comprising the steps of:
   (i) Causticising lithium chloride with sodium hydroxide to produce solids comprising a lithium hydroxide product;
   (ii) Filtering the solids resulting from the causticisation of step (i);
   (iii) Passing the filtered solids from step (ii) to a heating step in which anhydrous lithium hydroxide is produced;
   (iv) Filtering the anhydrous lithium hydroxide product of step (iii); and
   (v) Quenching the anhydrous lithium hydroxide of step (iv) with water to produce lithium hydroxide monohydrate crystals.

2. The process according to claim 1, wherein the lithium chloride of step (i) is a purified lithium chloride.

3. The process according to claim 1 or 2, wherein the lithium chloride of step (i) is obtained from either a brine or spodumene source.

4. The process according to claim 1, wherein the causticising step (i) employs a stoichiometric ratio of lithium chloride and sodium hydroxide.

5. The process according to claim 1, wherein the causticising step (i) is conducted in a series of three or more reaction vessels.

6. The process according to claim 5, wherein the residence time in each reaction vessel is between about 15 and 60 minutes.

7. The process according to claim 5, wherein the residence time in each reaction vessel is about 30 minutes.

8. The process according to claim 1, wherein after the relevant residence time of step (i) the product is filtered, producing a filtrate comprising precipitated lithium hydroxide monohydrate, sodium chloride and some un-reacted lithium chloride.

9. The process according to claim 8, wherein remaining solution from filtration, containing both lithium chloride and sodium hydroxide, is recycled to a first of a series of reaction vessels.

10. The process according to claim 1, wherein the heating step (iii) is conducted at about 500° C. in a closed nitrogen atmosphere.

11. The process according to claim 1, wherein the filtering step (iv) utilises ceramic filters.

12. The process according to claim 1, wherein the lithium hydroxide monohydrate crystals produced in step (v) are dried at about 45° C. under vacuum.

13. The process according to claim 1, wherein the lithium hydroxide monohydrate product is of a purity of greater than 99.9% by weight.

14. A process for the treatment of lithium chloride obtained from either spodumene or brine source to produce a lithium hydroxide monohydrate product, the process comprising the steps of:
   (i) Passing purified lithium chloride product obtained through either a brine or spodumene source to react with sodium hydroxide solution thereby producing lithium hydroxide;
   (ii) Wherein a stoichiometric ratio of solutions of LiCl and NaOH are allowed to react in series of reaction vessels for a residence time of fifteen minutes to an hour in each vessel, this reaction being exothermic;

(iii) Wherein after completion of residence time of the stoichiometric solutions of LiCl and NaOH in each reaction vessel, a mass which consists of precipitated lithium hydroxide monohydrate, sodium chloride and in part un-reacted LiCl is filtered;

(iv) All solids thus formed in all reaction vessels are collected, whereas spent mixture of solution of LiCl and NaOH is recycled to a first reaction vessel;

(v) The solids of step (iv) are heated at about 500° C. in closed nitrogen atmosphere, thereby melting lithium hydroxide which is in turn filtered; and (vi) Lithium hydroxide anhydrous thus obtained is quenched with water to form lithium hydroxide monohydrate crystals which are dried at 45° C. under vacuum, and packaged.

15. The process according to claim 14, wherein the lithium hydroxide monohydrate obtained is of a quality suitable for use as high purity battery grade cathode material.

16. The process according to claim 14, wherein a solid product of the filters of step (v), which consists of NaCl, but also some LiCl, are sent to re-leaching where LiCl is separated.

\* \* \* \* \*